(12) United States Patent
Kessler et al.

(10) Patent No.: US 8,094,377 B2
(45) Date of Patent: Jan. 10, 2012

(54) HEAD-MOUNTED OPTICAL APPARATUS USING AN OLED DISPLAY

(75) Inventors: David Kessler, Rochester, NY (US); Minoo Bablani, Herndon, VA (US)

(73) Assignee: NVIS, Inc., Reston, VA (US)

( * ) Notice: Subject to any disclaimer, the term of this patent is extended or adjusted under 35 U.S.C. 154(b) by 93 days.

(21) Appl. No.: 12/776,901

(22) Filed: May 10, 2010

(65) Prior Publication Data

US 2010/0290127 A1    Nov. 18, 2010

Related U.S. Application Data

(60) Provisional application No. 61/216,109, filed on May 13, 2009.

(51) Int. Cl.
*G02B 27/14* (2006.01)
*G02B 27/30* (2006.01)

(52) U.S. Cl. ........ 359/631; 359/630; 359/633; 359/637; 359/640; 359/641; 345/8; 353/20

(58) Field of Classification Search .......... 359/629–641, 359/618, 363; 353/20, 32–34, 37; 345/7–9
See application file for complete search history.

(56) References Cited

U.S. PATENT DOCUMENTS

| | | |
|---|---|---|
| 3,187,626 A | 6/1965 | Kapany |
| 4,682,862 A | 7/1987 | Moskovich |
| 5,539,578 A * | 7/1996 | Togino et al. ............. 359/630 |
| 5,546,227 A * | 8/1996 | Yasugaki et al. ........... 359/630 |
| 5,661,604 A * | 8/1997 | Kuba ....................... 359/637 |
| 5,696,521 A | 12/1997 | Robinson et al. |
| 5,708,529 A * | 1/1998 | Togino et al. ............. 359/630 |
| 6,147,807 A * | 11/2000 | Droessler et al. .......... 359/637 |
| 6,487,021 B1 * | 11/2002 | Ophey ..................... 359/631 |
| 6,903,875 B2 | 6/2005 | Achtner |
| 2009/0295683 A1 | 12/2009 | Pugh et al. |

OTHER PUBLICATIONS

Ozan Cakmakci and Jannick Rolland, Head-Worn Displays: A Review, Journal of Display Technology, vol. 2, Issue 3, pp. 199-216 (2006).

* cited by examiner

*Primary Examiner* — Loha Ben
(74) *Attorney, Agent, or Firm* — Louis S. Horvath

(57) ABSTRACT

A see-through head-mounted optical apparatus for a viewer has at least one display module, each display module having a display energizable to form an image and a positive field lens optically coupled to the surface of the display and disposed to direct imaged light from the display toward a first surface of a prism. A curved reflector element is in the path of the imaged light through the prism and disposed at a second surface of the prism, opposite the first surface. The curved reflector element has a refractive surface and a curved reflective surface disposed to collimate imaged light received from the display and direct this light toward a beam splitter that is disposed within the prism and that is at an oblique angle to the collimated reflected light. The beam splitter redirects the incident collimated reflected light through the prism to form an entrance pupil for the viewer.

19 Claims, 23 Drawing Sheets

HEAD-MOUNTED OPTICAL APPARATUS USING AN OLED DISPLAY

CROSS REFERENCE TO RELATED APPLICATIONS

Priority is claimed from U.S. Ser. No. 61/216,109, provisionally filed on May 13, 2009, entitled "An Optical Device Using an OLED Display Device", in the names of David Kessler and Minoo Bablani, commonly assigned and incorporated herein by reference.

STATEMENT REGARDING FEDERALLY SPONSORED RESEARCH OR DEVELOPMENT

The present invention was developed with U.S. government support under contract No. W91C RB08C 0151 awarded by the U.S. Army. The government has certain rights in the invention.

FIELD OF THE INVENTION

This invention generally relates to head-mounted display systems for viewing electronically generated images that are superimposed upon the see-through field of view and more particularly relates to an apparatus and method for an arrangement of optical components to provide a head-mounted optical apparatus that provides a very wide field of view and large entrance pupils.

BACKGROUND OF THE INVENTION

Head-Mounted Displays (HMDs) have been developed for a growing number of uses in a range of applications, including military, commercial, industrial, fire-fighting, and entertainment applications. The design of these devices is particularly challenging due to factors such as variable facial geometry, expectations of reduced size, weight, and cost, the need for improved imaging, and requirements for ease of use.

In general, HMD optics must meet a number of basic requirements for viewer acceptance, including the following:
  (i) eye relief or eye clearance. The eye relief range is defined based on viewer comfort and the optical configuration of the human eye itself. In practice, the distance between the last optical surface of the HMD optics and the viewer's eye is preferably above about 20 mm.
  (ii) entrance pupil size. The entrance pupil requirement is based on physiological differences in viewer face structure as well as on gaze redirection during viewing. An entrance pupil size of at least about 10 mm diameter has been found to be workable.
  (iii) field of view. For visual tasks of targeting and object recognition, a field of view (FOV) approaching about 50 degrees is considered to be sufficient.

For many military and commercial applications, see-through capability is also required, allowing the viewer to have the advantages of both good scene visibility and, superimposed on the scene, a synthetic, electronically generated image. The human eye also has difficulty focusing on source objects at very short distances from the eye without causing eye strain. The near point for the unaided human eye is defined as the closest distance that the eye can focus on an object without causing eye strain. The near point for the unaided human eye is about 25 cm for an average middle aged adult. The near point is much longer for an older adult and can be as long as 100 cm. An HMD must provide imaging that allows sufficient translational distance.

Imaging by forming a large pupil has particular advantages when providing an HMD solution with a wide field of view. However, with conventional lens design approaches, forming a large pupil inherently causes other problems, since the lens design must attempt to correct for the pupil as well as for the wide field. The lens system must not only be able to correct for on-axis aberrations (chiefly spherical aberration and axial chromatic aberration), but for off-axis aberrations as well, including coma, astigmatism, field curvature, and distortion, and chromatic lateral aberrations. Therefore, conventional lens design approaches do not yield simple solutions for correcting aberrations when providing a large pupil with a wide field of view.

Another well known problem in achieving wide field of view using conventional optics systems is illumination falloff due to the Cosine Fourth Law, in which image brightness is reduced at a rate proportional to $\cos^4$ of the off-axis field angle. This effect can detract from realistic appearance of a synthetically generated image.

In practice, a number of tradeoffs are made with respect to these optical requirements and with respect to the overall requirements for reduced size and weight. For example, increasing the FOV tends to decrease image resolution. Improving distortion requires additional lenses, adding weight and bulk. Improving image quality overall requires a larger image source, with added weight, cost, and spacing requirements.

There have been a number of design solutions proposed and implemented for providing HMDs using various types of image sources. For example, liquid crystal devices (LCDs) and reflective liquid crystal on silicon (LCoS) devices have been used for generating the electronic images, as have various other types of spatial light modulators. Designs using such devices are hampered by the requirement that a separate light source or sources be provided. More recently, devices using Organic Light Emitting Diode (OLED) displays have been proposed for providing the source image for HMD devices. However, OLED display devices present a number of challenges to HMD design. A considerable magnification is required in order to provide a viewable image from the OLED device. Off-axis designs for electronic devices in general are less efficient than on-axis designs and require corrective optics due to image aberrations.

There is, then, a need for an inexpensive, compact HMD using an OLED device that provides the observer with a large field of view, sufficient eye relief and entrance pupil size, and an image with good image quality and with sufficient near-point distance for viewing.

SUMMARY OF THE INVENTION

It is an object of the present invention to advance the art of head-mounted display imaging. With this object in mind, the present invention provides a see-through head-mounted optical apparatus for a viewer comprising at least one display module, each display module comprising:
  a display that is energizable to form an image;
  a positive field lens optically coupled to the surface of the display and disposed to direct imaged light from the display toward a first surface of a prism; and
  a curved reflector element in the path of the imaged light through the prism and disposed adjacent to a second surface of the prism, opposite the first surface, the curved reflector element comprising a refractive surface and a curved reflective surface that is disposed to collimate imaged light received from the display and direct this light toward a beam splitter that is disposed within the prism and that is at an oblique angle to the collimated reflected light;

wherein the beam splitter redirects the incident collimated reflected light through the prism to form an entrance pupil for the viewer.

A feature of the present invention is the use of emissive display devices for forming the source image.

It is an advantage of the present invention that it provides a compact, lightweight HMD device having an improved field of view over other designs.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
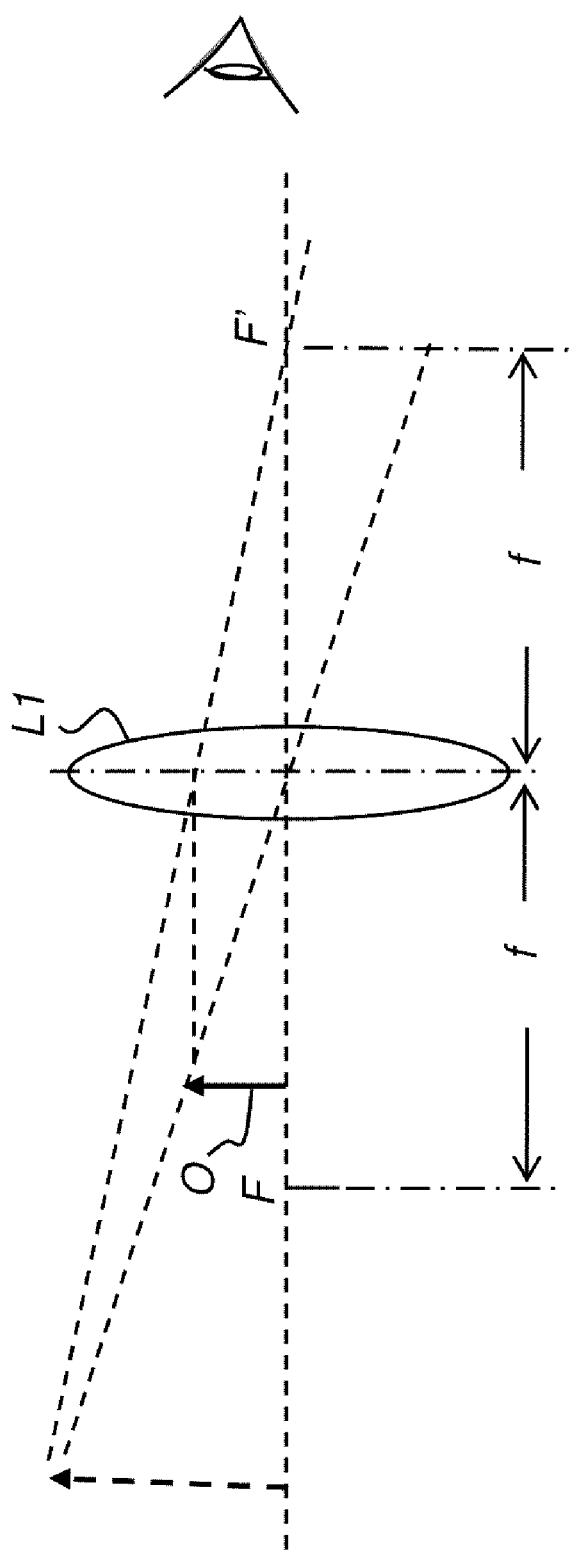
FIG. 1 is a schematic diagram showing how a virtual image is formed.

Elements not specifically shown or described may take various forms well known to those skilled in the art. Figures shown and described herein are provided in order to illustrate key principles of operation and component relationships and timing according to representative embodiments of the present invention and are not drawn with intent to show actual size or scale. Some exaggeration may be necessary in order to emphasize basic structural relationships or principles of operation. Some conventional components that would be needed for implementation of the described embodiments, such as various types of supporting optical components, for example, are not shown in the drawings in order to simplify description of the invention itself. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another.

The term "collimated light" refers to light having substantially the same direction. Collimated light is neither convergent nor divergent.

The term "minor" is used as a general term to refer to a reflective surface or reflector element. This may be a mirrored or coated surface, for example.

The term "oblique", as used in the present disclosure, describes an angular relationship that is not parallel or normal, that is, other than an integer multiple of 90 degrees. In practice, two surfaces are considered to be oblique with respect to each other if they are offset from parallel or normal by at least about +/−10 degrees or more. Similarly, a line and a plane are considered to be oblique to each other if they are offset from parallel or normal by at least about +/−10 degrees or more.

The term "prism" or "prism element" is used herein as it is understood in optics, to refer to a transparent optical element that is generally in the form of an n-sided polyhedron with generally flat surfaces upon which light is incident and that is formed from a transparent, solid material that refracts light. It is understood that, in terms of shape and surface outline, the optical understanding of what constitutes a prism is less restrictive than the formal geometric definition of a prism. For example, surfaces need not be flat, but may be rounded or otherwise featured, nor are side surfaces necessarily identical to or parallel with each other. A composite prism is an assembled prism formed from two or more prism elements, each separately fabricated and coated, then glued together or otherwise arranged or mounted.

Embodiments of the present invention provide a head-mounted device for see-through imaging. In this type of device, the viewer sees the outside or "real-world" scene content and, visually superimposed upon that scene content, an electronically generated image. Design of such devices places considerable constraints on how electronically generated images are formed and displayed, since the view of the external scene must not be obstructed.

The apparatus of the present invention provides a virtual image using a display such as an OLED or other emissive display device or, alternately, using a transmissive display device that has an external light source. The description that follows is directed primarily to OLED and similar emissive devices which are advantaged for smaller size and packaging considerations. However, it should be noted that other display types could alternately be used.

In order to more fully understand the invention, it is instructive to consider how the virtual image differs from a real image and how the virtual image is formed. A real image refers to an image that can be observed directly by the unaided human eye. A real image exists at a given location when a real image can be observed by the unaided eye if a viewing surface is positioned at the location. A photograph is an example of a real image. The OLED is an example of an electronic display that provides a real image. Other types of displays that form a real image include liquid crystal displays, CRT monitors, and projection screens. The size of the display surface limits the size of the real image that can be provided to the observer.

HMDs and other compact electronic devices, because of their small size, have a limited surface area on which to provide a real image and limited space for viewing distance. For these devices, forming a virtual image has particular advantages.

By contrast to real image displays, virtual image displays provide an image that is not observable on a viewing surface. The virtual image is formed at a location in space where no display surface exists. A classic example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image electronic displays thus have the advantage of eliminating the need for a large display surface in order to produce a large electronic image.

FIG. 1 shows schematically how a virtual image is formed from a source object O that is placed within the focal length f of a lens L1 or other magnifier. The virtual image that is formed appears to the viewer at F' and is enlarged and has the same orientation as the source object. As a result of this type of image formation, the size of the virtual image, as perceived by the user, is limited by the magnification of the display system as opposed to the size of the electronic display. This enables virtual image displays to be designed that provide the same amount of information per screen as real image displays, yet occupy a smaller space.

A virtual image is created by an optical system of some kind. In forming a real image, the eye and the viewing surface properties determine the viewing parameters. By contrast, in a virtual image display, the optical system determines most of the viewing parameters.

In the case of a virtual HMD display, a real image that serves as the source object is first formed by an imaging component that is electronically energizable to form an image from image data. In embodiments of the present invention described herein, this is an OLED or other emissive display device, miniaturized to reduce its cost and to reduce the overall size of the display system. Alternate embodiments include transmissive devices such as liquid crystal devices (LCDs) that modulate light from a separate light source. Magnifying optics are then utilized to form the virtual image that is generated on the OLED device and that is actually seen by the viewer.

An important aspect of the functioning of a virtual image display is the ease of viewing the virtual image. In this regard, it is important for the display to provide a wide apparent angular width of the virtual image, commonly referred to as the field of view FOV of the virtual image. The full field of view is defined as the ratio of the largest apparent dimension of the virtual image to the apparent distance to the virtual image. This is generally equivalent to the field of view for a real image display surface.

Figure 2:
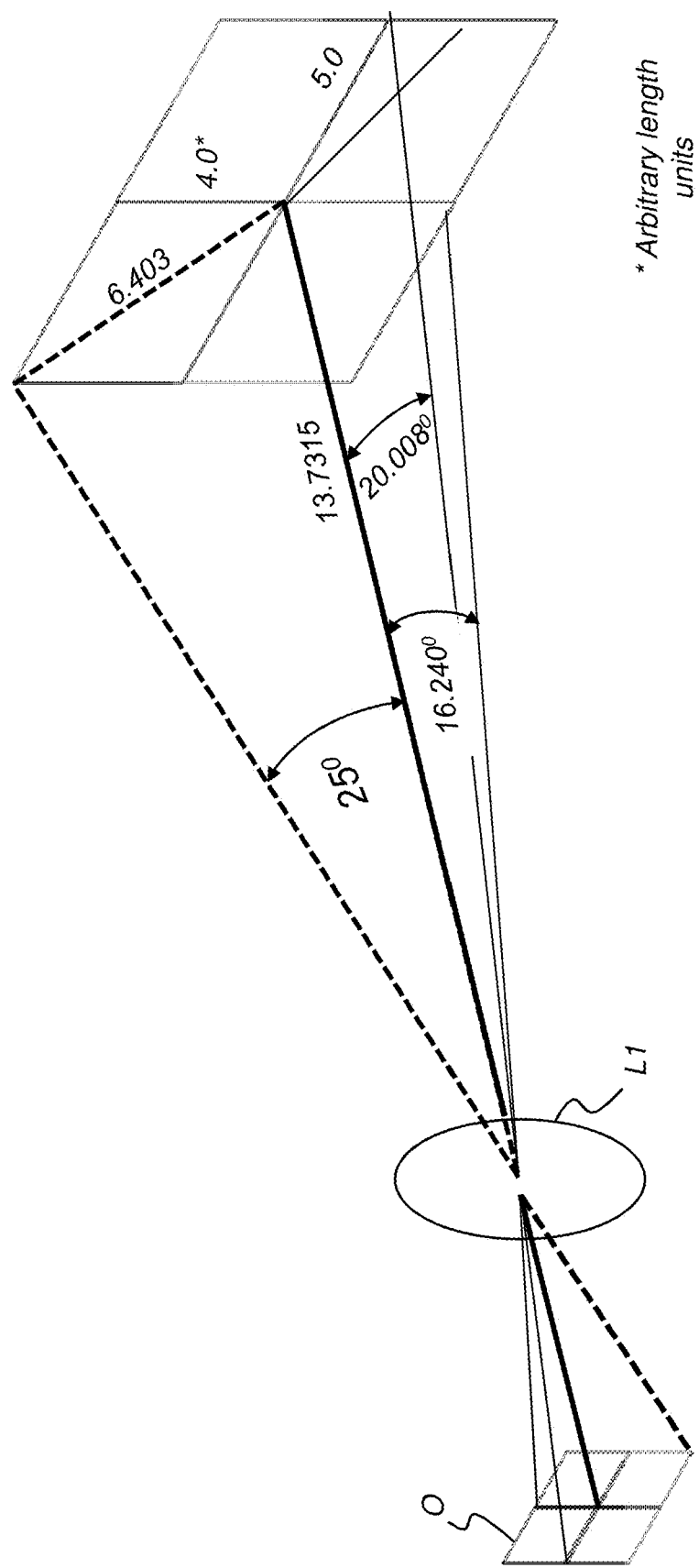
FIG. 2 is a schematic diagram showing how field of view is measured.

The schematic diagram of FIG. 2 shows how the field of view is measured for the virtual image that is formed at the right from the source image O at the left. Here, the FOV measurement is across the diagonal, showing a half-FOV of 25 degrees. A wide field of view requires a large aperture through which the image is viewed in order to have a comfortable eye relief, that is, distance between the display and the eye.

One challenge to HMD design is to achieve a large enough field within the rigid size constraints of highly compact optics. In considering FOV limitations, the following relationship holds:

$$\text{FOV (degrees)} = 2 \tan^{-1}(S/2f) \quad (1)$$

wherein S is the size of the source image and f is the focal length. Based on this relationship, the size of the field can be increased by either providing a larger source image S to system optics or providing a shorter focal length f. Embodiments of the present invention consider both factors S and f to obtain a large FOV given the spacing and packaging constraints of HMD design.

In addition to field of view, other parameters relating to the ease of viewing the image associated with virtual image displays include:

(i) The eye-relief, which is distance from the eye at which the optical system can be held, with the eye still capable of viewing the entire virtual image. Optical devices that provide a short eye relief are undesirable due to the inconvenience and discomfort associated with placing the eye in close proximity with the optic. It is therefore generally preferred that an optical system provide a eye relief of more than 20 mm to enable the magnified image to be viewed through the optic at a comfortable and convenient range of distances from the optic and to allow viewing by a person who wears eyeglasses.

(ii) The transverse distance that the eye can move with respect to the optical system and over which the eye can still see the entire virtual image through the optical system. This space within which the eye can move is sometimes referred to as the "eye-box".

Virtual image electronic display systems are generally divided into two broad classes, on-axis display systems and off-axis display systems. An on-axis display system refers to a system having components that are symmetrical about a common optical axis. In a typical on-axis system, any of the components forming the on-axis display system can be rotated about the optical axis without disturbing the display system. On-axis display systems provide the advantage of producing a virtual image with a minimal amount of aberration. Reflective optical systems have the advantage of being naturally color corrected. However, reflective on-axis display systems have the disadvantage of being spatially inefficient due to the obscuration that results when the components are linearly arranged along the optical axis.

By contrast, off-axis display systems refer to display systems wherein one or more components are positioned such that symmetry about the optical axis is not provided. Any optical system that includes tilted or displaced optics is an off-axis optical system as that term is used herein. By placing one or more components off-axis, off-axis display systems can be adapted to efficiently fit within the contours of the devices in which they are used. However, off-axis display systems have the disadvantage that redirecting an image off-axis introduces aberrations into the image which can significantly deteriorate the image quality produced. The image quality can frequently be enhanced using additional optical elements which reduce the significance of the aberrations. However, these additional optical elements add to the size, complexity, and cost of the display.

Figure 3:
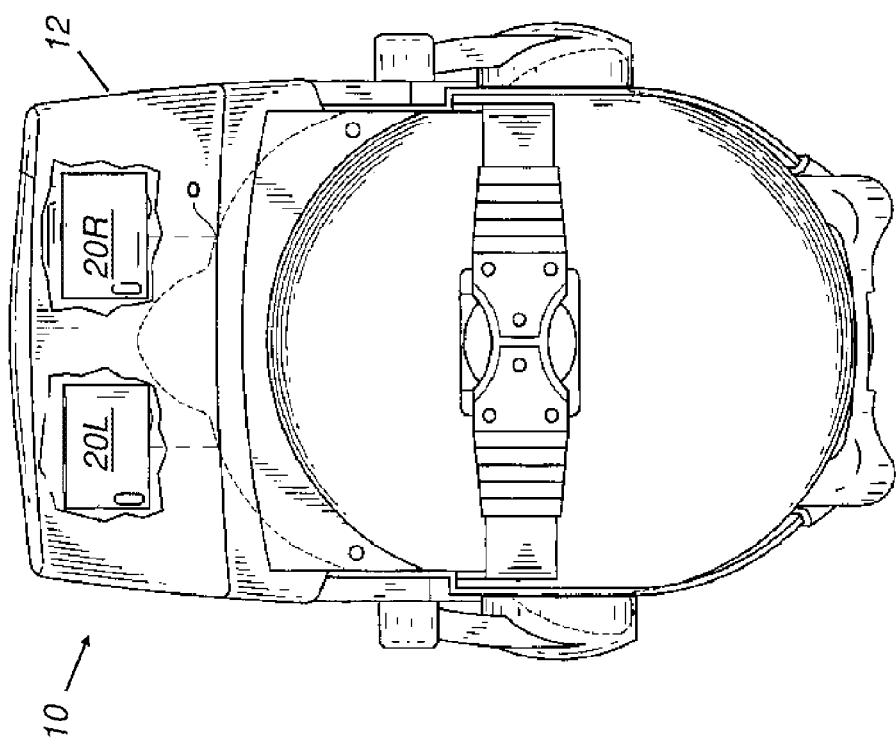
FIG. 3 is a top view of a head-mounted display device showing the position of internal display modules.

FIG. 3 is a top view of a see-through head-mounted optical apparatus 10 or HMD according to an embodiment of the present invention. There is a display module 20 for each eye of the viewer, shown as 20L and 20R in this figure, mounted within a support 12. Display module 20 allows the viewer to see through optical components that provide the electronically generated image to the viewer.

Figure 4A:
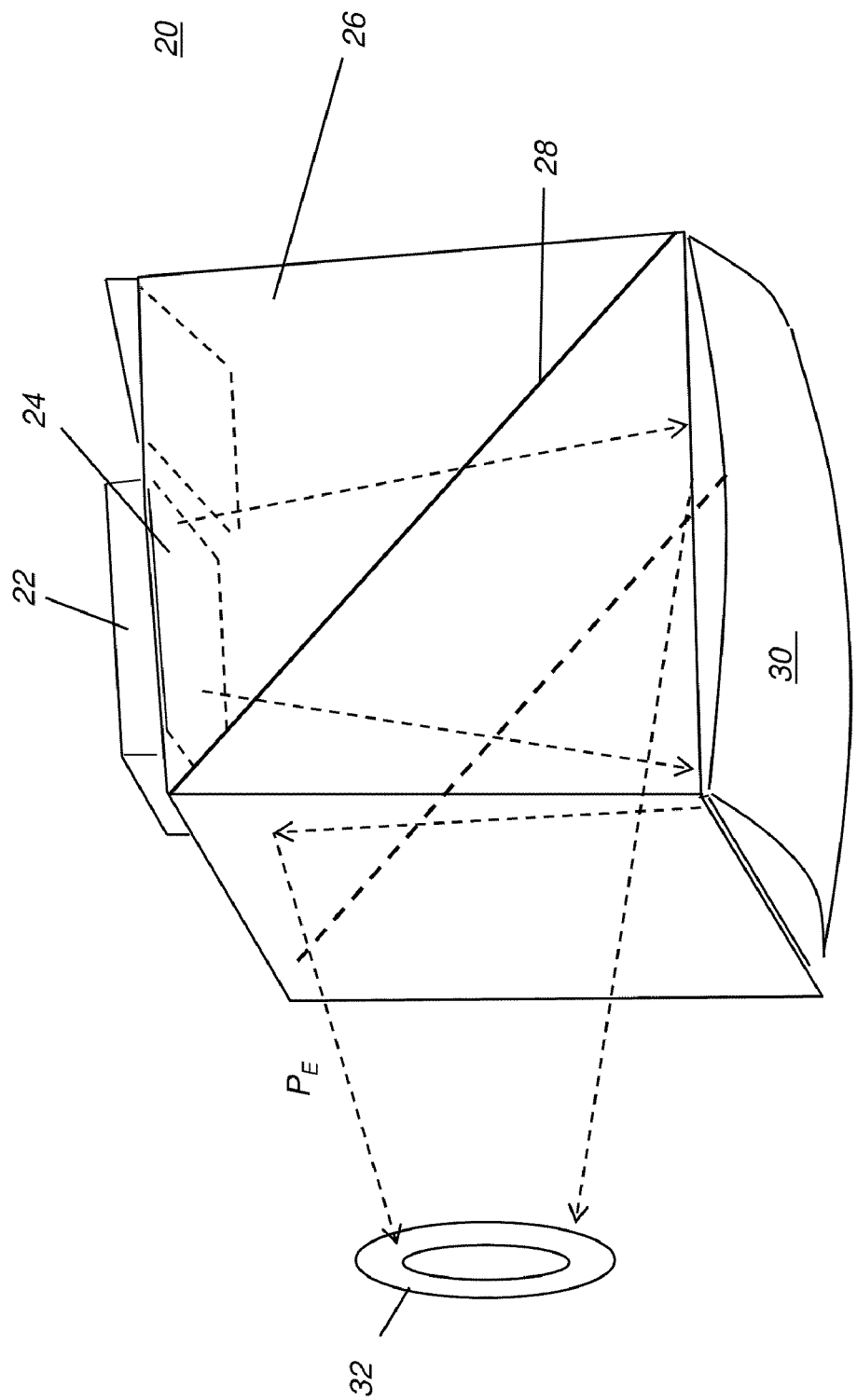
FIG. 4A shows a perspective view of a display module according to one embodiment of the present invention.
Figure 4B:
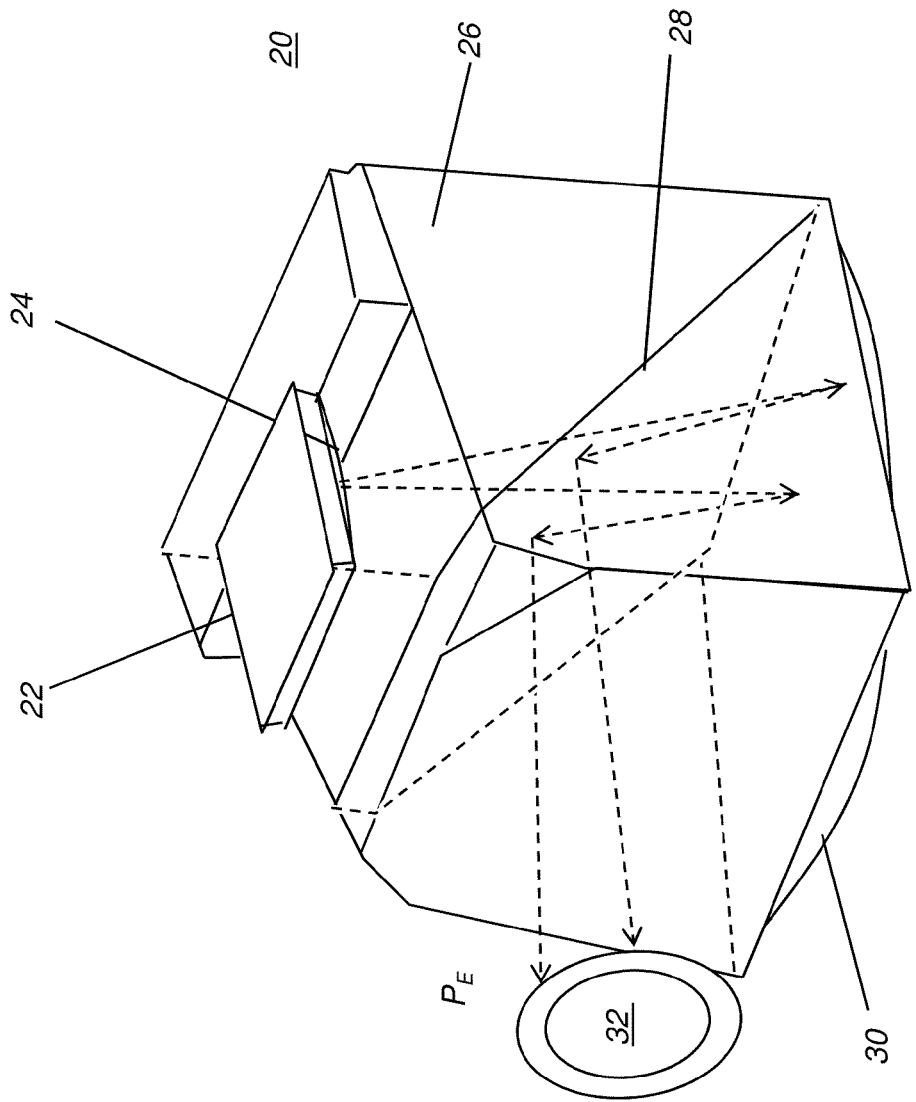
FIG. 4B shows a perspective view of a display module from an alternate angle according to one embodiment of the present invention.

FIGS. 4A and 4B show perspective views of display module 20, showing paths of light that represent the entrance pupil $P_E$ of the optical apparatus. Each display module 20 has an emissive display 22 that directs imaged light through an immersion field lens 24. Field lens 24 is positioned close to the real image formed on emissive display 22 and directs light to a prism 26, through a first surface of the prism, and through a beam splitter 28, toward a reflector element, curved mirror 30 that is located against an opposite, second surface of the prism. Curved mirror 30 collimates the incident light and corrects for field curvature, directing the light back outward toward beam splitter 28. This light is then directed toward the eye of the viewer, shown as an eye box 32. As is shown in FIG. 4B, some shaping of prism 26 is possible, such as for improved fitting relative to the viewer and reducing the weight of the optics.

Figure 5:
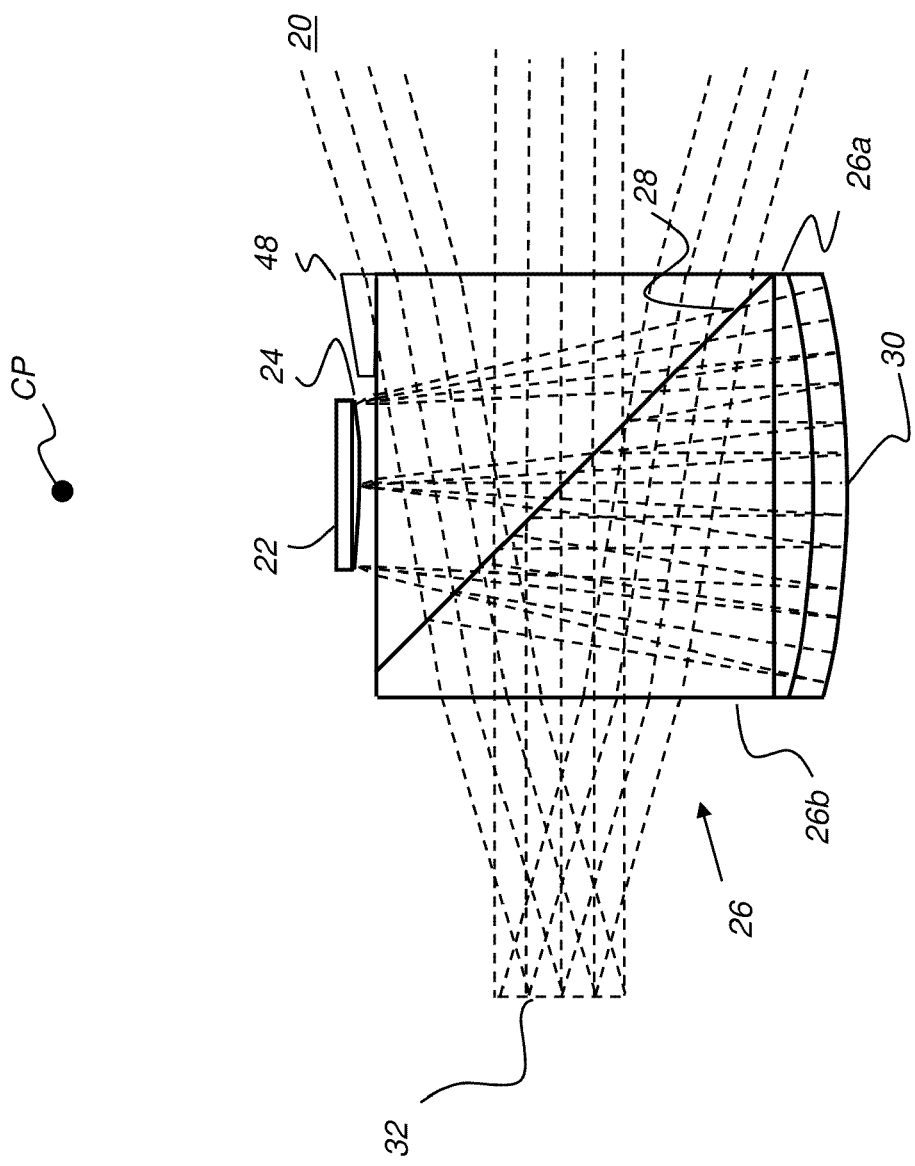
FIG. 5 is a side view showing components of the display module in an optically concentric arrangement.
Figure 6:
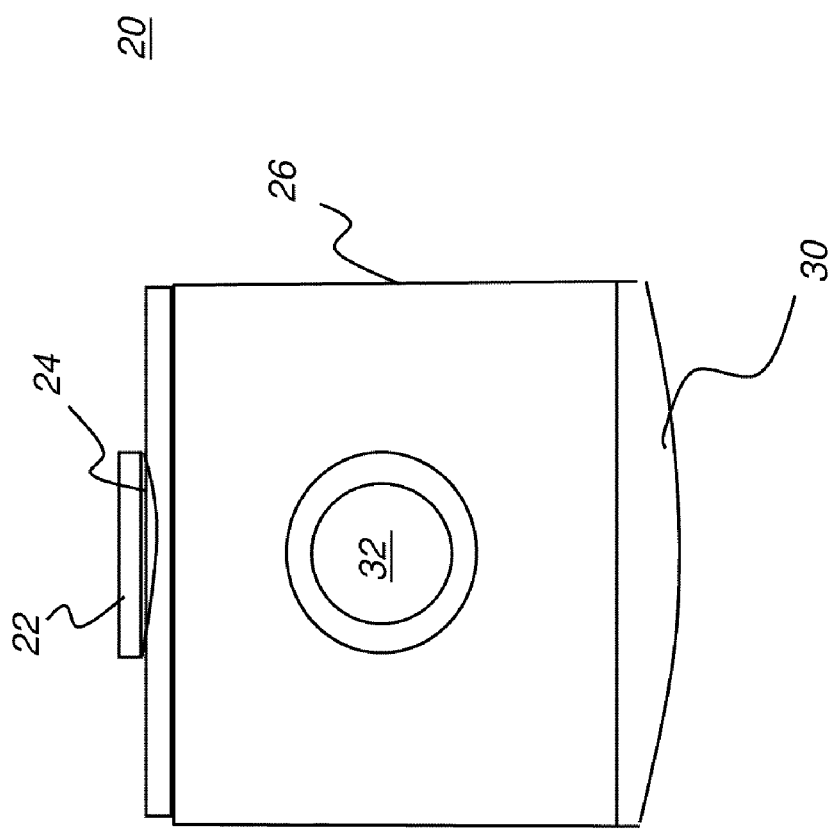
FIG. 6 is a view from the eye box showing positioning of components of the display module.

The side view of FIG. 5 and rear view of FIG. 6 show components of display module 20 in a concentric arrangement. Here, curved optical components, minor 30 and field lens 24, have a common center of curvature at point CP. In an unfolded view of the system, the viewer's eye is at point CP. Concentric design is advantaged for improved performance over a large field, reduced distortion, and reduced image aberration. In FIG. 5, components of prism 26 are shown in more detail; two prism segments 26a and 26b are cemented together with beam splitter 28 at their interface. A third prism segment 48 is provided to reduce vignetting, as described in more detail subsequently.

As noted earlier, a significant limitation with head-mounted devices overall relates to the size of the field. With respect to equation (1) given earlier, embodiments of the present invention provide a larger FOV both by increasing the effective image size (S) and decreasing the effective focal length (f). The effective size of source image S is increased using field lens 24.

Configurations of Field Lens 24

In conventional imaging system design, a field lens is positioned at or near the location of an internal image and is often used to correct field curvature. Embodiments of the present invention position field lens 24 close to the image source provided by emissive display 22 in order to increase the dimensions of the electronically generated image.

Figure 7:
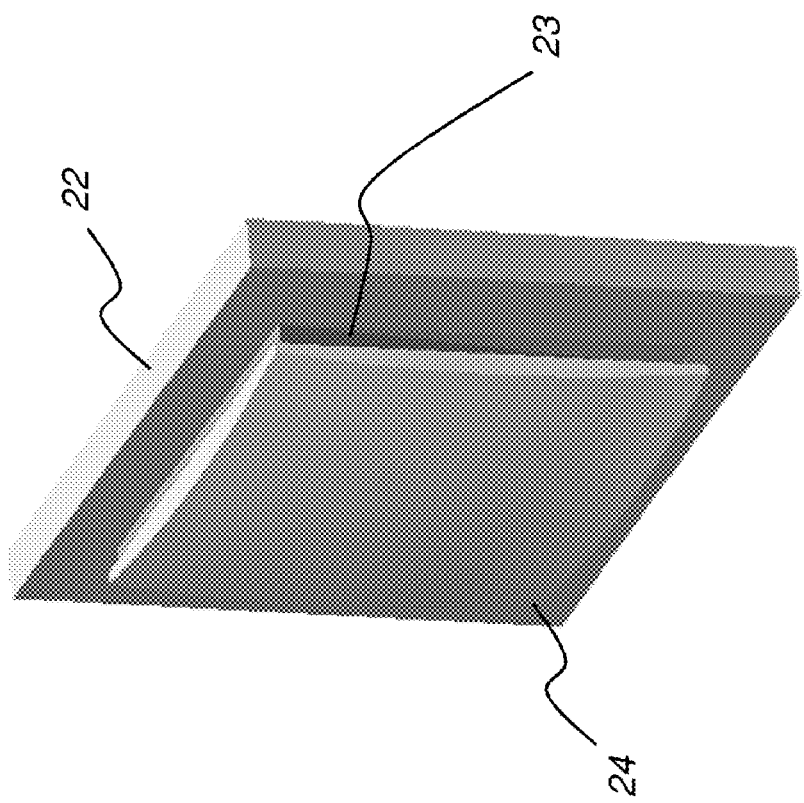
FIG. 7 is a perspective view of the field lens and emissive display according to one embodiment.
Figure 8:
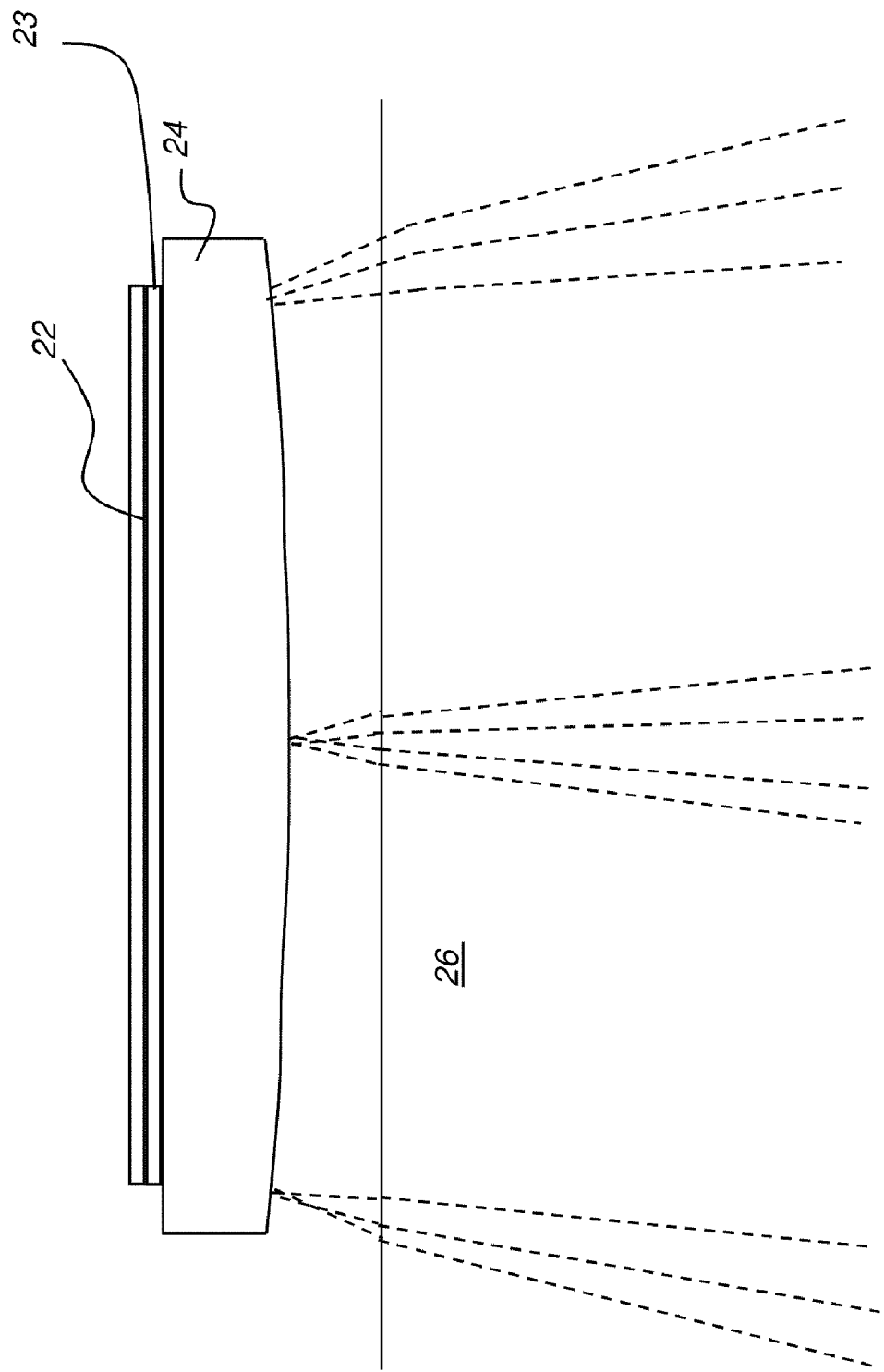
FIG. 8 is a side view of the field lens and emissive display.

As is shown in FIGS. 7 and 8, field lens 24 is mounted on, and optically coupled to, the surface of emissive display 22. As manufactured, the emissive image of emissive display 22 is commonly covered with a protective cover glass 23 that has a typical thickness of about 0.5 to 1 mm. Embodiments of the present invention use or remove cover glass 23 in order to provide the needed image from field lens 24.

Figure 9A:
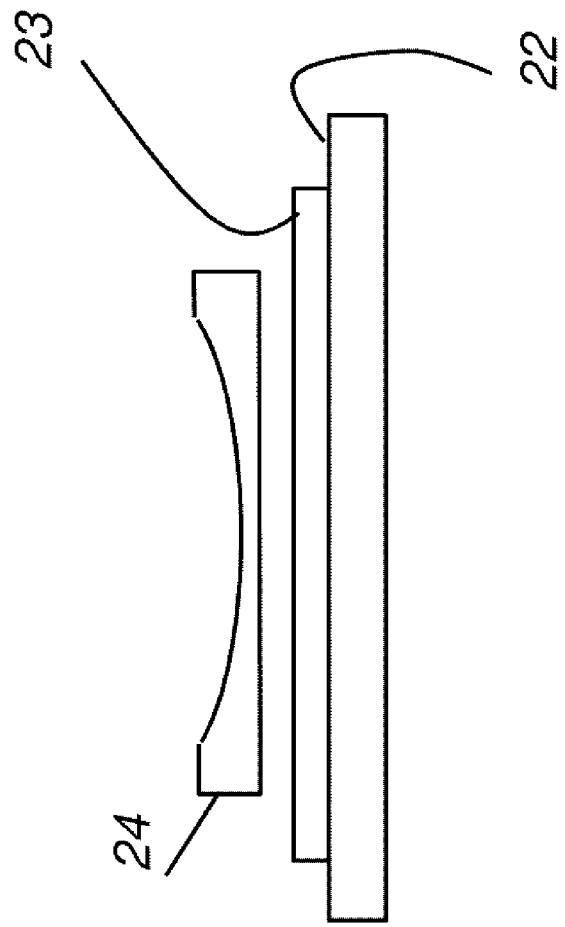
FIGS. 9A, 9B, 9C, 9D, 9E, 9F, 9G, and 9H are side view diagrams showing various embodiments of a field lens.

FIGS. 9A through 9H show, from a side view, the use of field lens 24 with emissive display 22 in various embodiments. FIG. 9A shows the conventional arrangement of field lens 24 in an imaging apparatus. Here, field lens 24 is spaced apart from display 22 and acts as a "field flattener" that corrects for the field curvature of the generated image, generally curving toward the lens. Field lens 24 is a negative lens in this conventional embodiment.

Figure 9B:
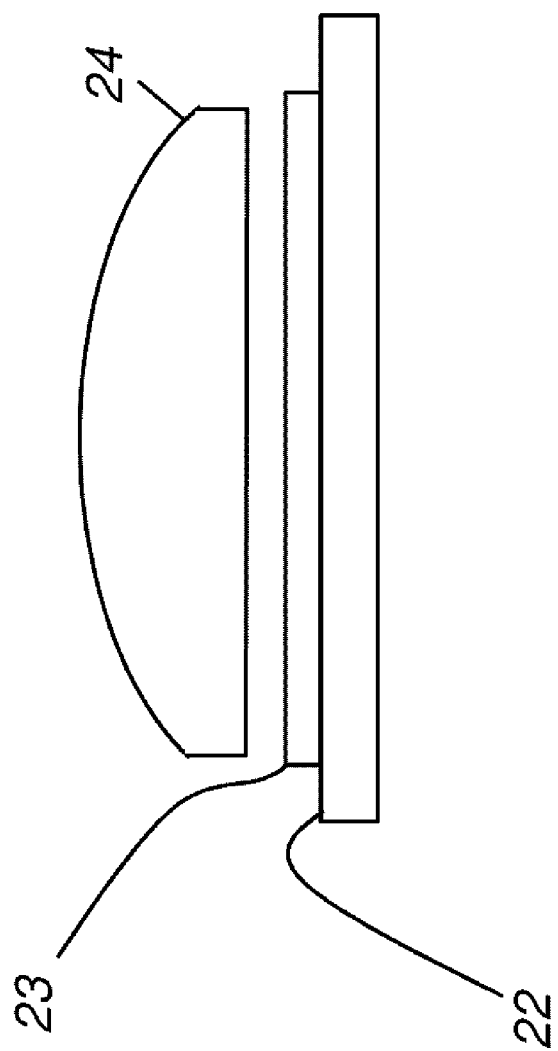

Embodiments of the present invention employ the field lens in a different way from that shown in FIG. 9A and require the use of a positive lens instead. FIG. 9B shows a positive field lens 24 formed from glass or other monolithic substrate. In this embodiment, field lens 24 is spaced apart from display 22 and its cover plate 23. This arrangement is disadvantaged because of the added height and optical effects caused by the air gap.

Figure 9C:
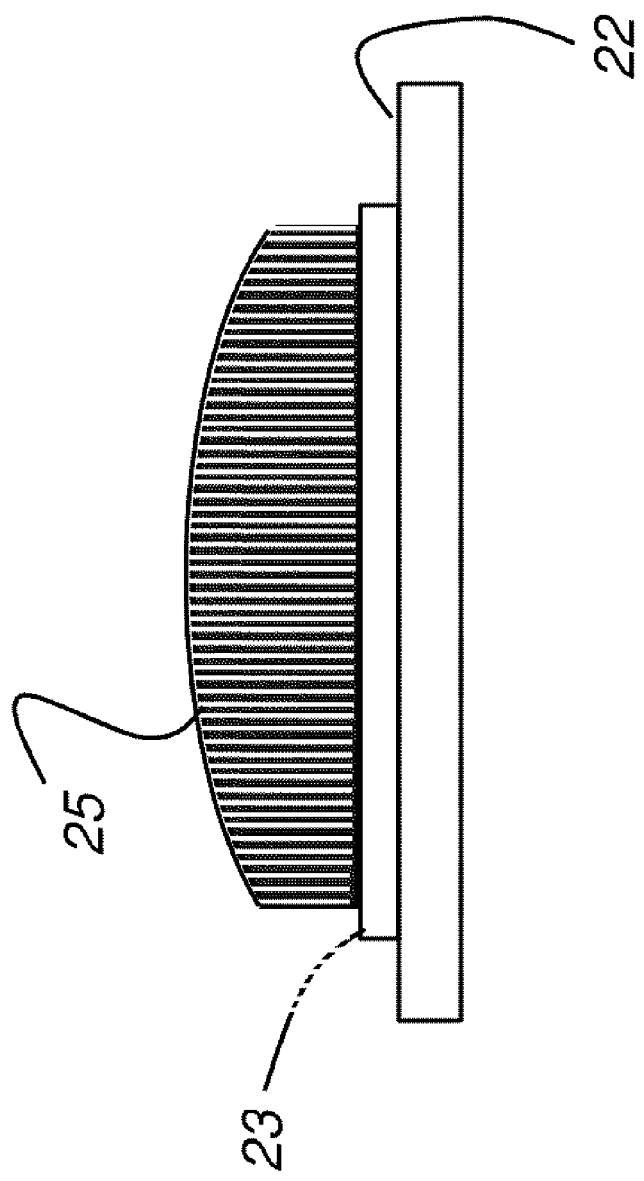

FIG. 9C shows an embodiment using a fiber lens 25 in the position of the field lens. A fiber lens is a lens formed from a ground and polished fiber faceplate. Fiber lenses for a negative lens are shown, for example, in U.S. Pat. No. 3,187,627 entitled "Microscope and Recording Optical Systems Utilizing Tapered Light Conducting Fiber Bundles" to Kapany. Negative fiber lenses, also called fiber field flatteners or image conduits, have been used in night vision goggles and image intensifiers, for example. The fiber width is typically a fraction of the image pixel size. In the FIG. 9C embodiment, fiber lens 25 is cemented or otherwise optically coupled to the surface of cover glass 23. This arrangement does not work well, however, due to light spreading within cover glass 23 and poor light handling at the interface.

Figure 9D:
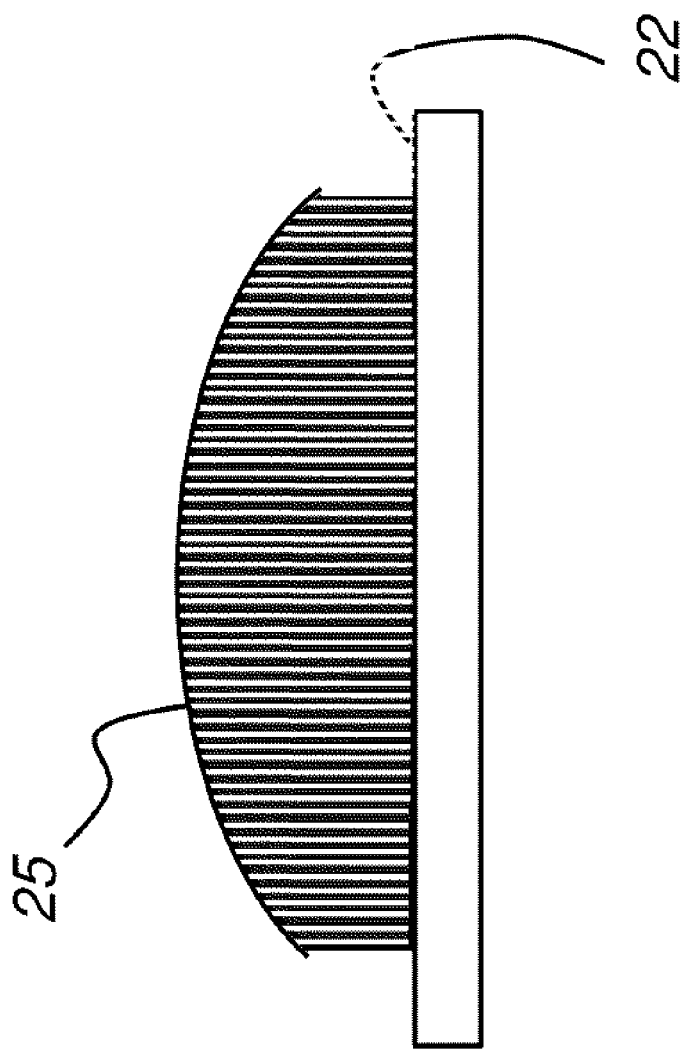

FIG. 9D shows an alternate embodiment in which emissive display 22 does not have a cover glass. Instead, fiber lens 25 is optically coupled to the surface of display 22 itself. This configures fiber lens 25 as a type of immersive lens, directly coupled to the image source itself. Configured as an immersion lens, fiber lens 25 provides a larger FOV within a limited space.

Figure 9E:
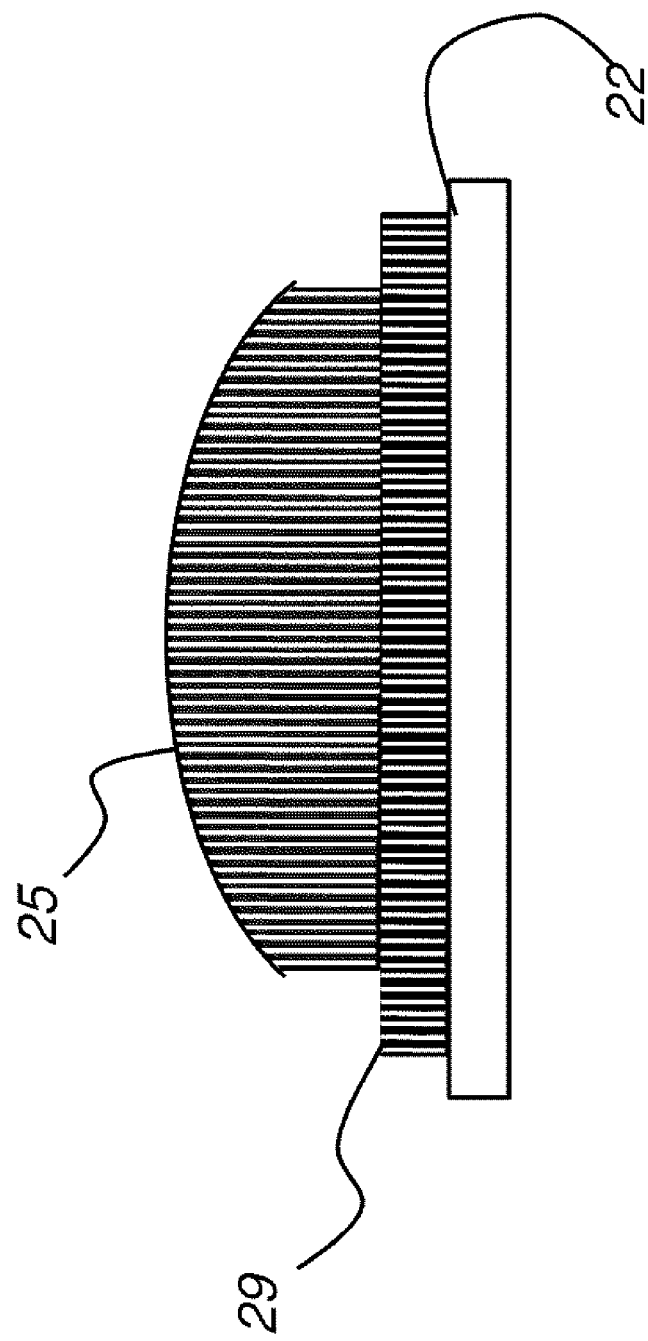

Emissive device manufacturers such as eMagin Corporation, Bellevue, Wash., for example, have recognized the potential value of replacing cover plate 23 with a fiber face plate and offer this configuration with emissive OLED display components. FIG. 9E shows an emissive display 22 having a fiber optic faceplate 29 coupled to fiber lens 25. This arrangement is workable, but some image artifacts are likely due to fiber array alignment.

Figure 9F:
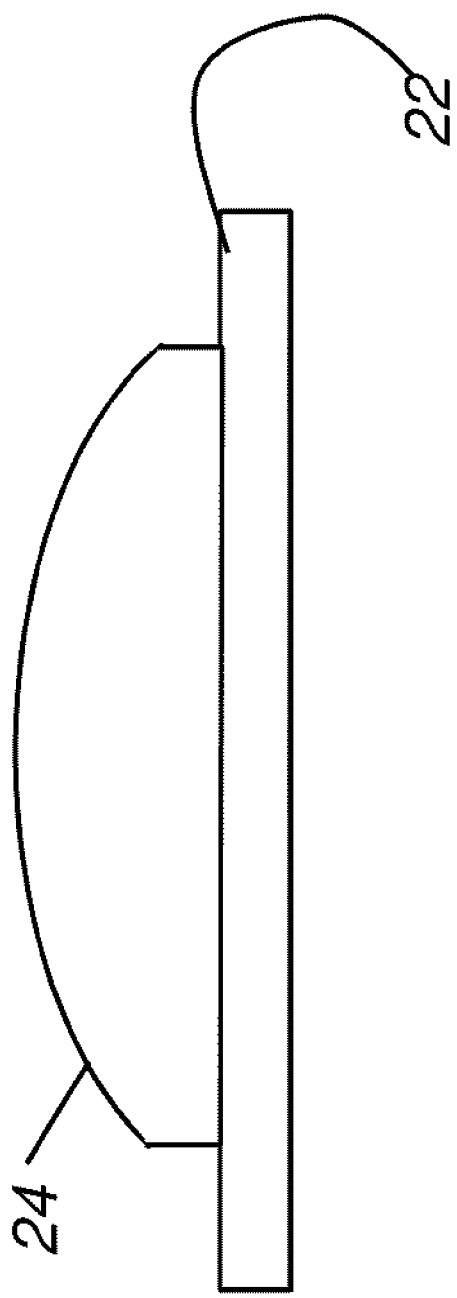
Figure 9G:
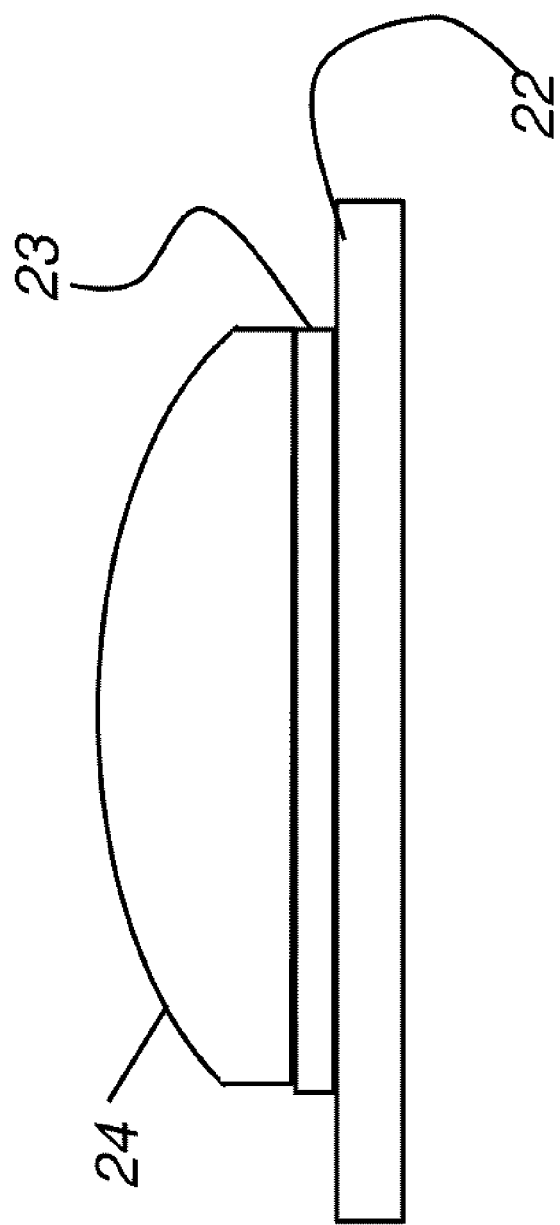

FIG. 9F shows an alternate embodiment with field lens 24 cemented directly to the surface of emissive display 22. FIG. 9G shows an embodiment with field lens 24 cemented onto cover glass 23. Both of these embodiments are workable, but have some difficulties. The FIG. 9F embodiment requires special manufacturing techniques and can be costly to implement. The FIG. 9G embodiment is disadvantaged for its thickness and requires index-matching of field lens 24 and the optical cement used.

Figure 9H:
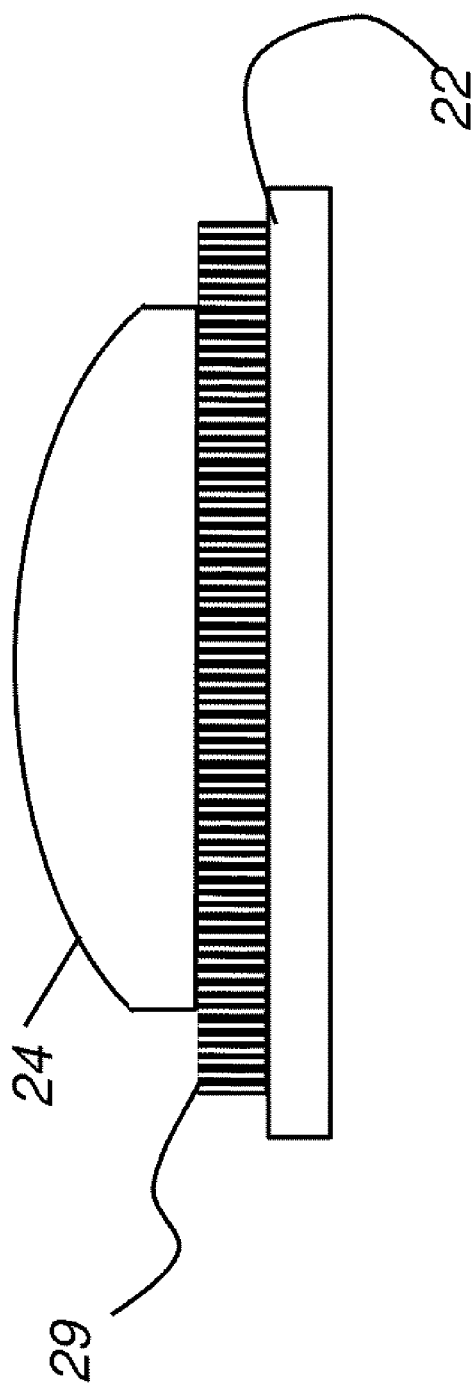

FIG. 9H shows an embodiment that provides the needed field enlargement and has practical advantages for cost, size, and relative ease of implementation. Display 22 is provided with fiber faceplate 29, as was described earlier with reference to FIG. 9E. Field lens 24 is then cemented in place to provide optical contact with fiber faceplate 29.

Each of configurations 9C through 9H provide field lens 24 in an immersive lens embodiment. Immersive configuration in this way helps to enlarge the image formed on display 22 within a reduced amount of space of display module 20 and thus reduces the demands for magnification that would otherwise be needed from a field lens that is not in optical contact with the emissive display and from other components in the optical system. Referring back to equation (1), the use of field lens 24 as a positive lens in an immersion lens configuration increases FOV by increasing the effective size of source image S.

Figure 10:
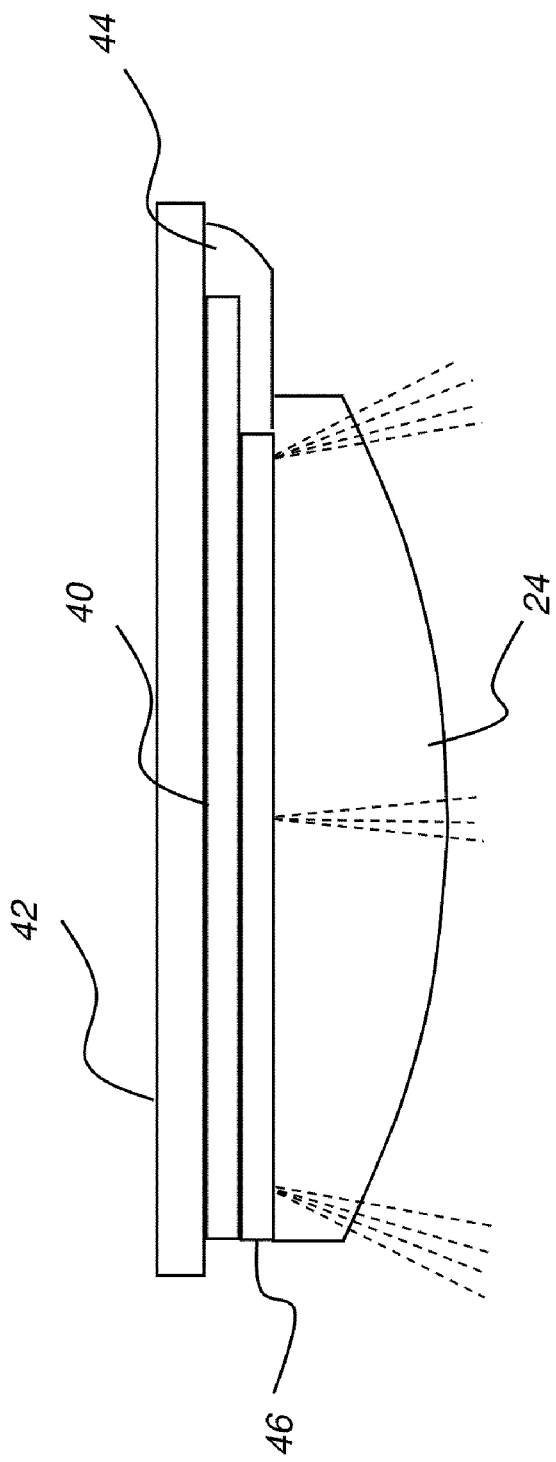
FIG. 10 is an enlarged side view of the field lens and emissive display.

The side view of FIG. 10 shows an enlarged view of an OLED device 40 on a circuit board 42 according to one embodiment of the present invention.

Encapsulation material 44 protects the wires connected to the OLED device 40 along its right edge. A cover fiber plate 46 is provided for directing light outward to lens 24.

Use of Prism 26

Referring back to equation (1) given earlier, embodiments of the present invention provide a larger FOV both by increasing the effective image size (S) and decreasing the effective focal length (f). The effective focal length f is decreased using prism 26. To provide the needed focal length within a confined distance and with little or no vignetting, prism 26 is formed from a high-index material, such as a high-index glass or plastic. In the context of the present invention, the term "high index" is defined as having an index of refraction n that is higher than about 1.65 for light in the visible range.

One problem inherent to HMD design with an emissive source relates to the need for reduced weight. The heaviest element in the embodiments of display module 20 is prism 26. The prism size is determined by the requirements such as the field of view, the eye relief, the size of display device 22 and the refractive index of the prism material itself. High index glass tends to have correspondingly higher density and weight. To help alleviate the weight problem, embodiments of prism 26 are formed from high-index plastics, such as LPB 1101 or LPH 11/01 from Mitsubishi Gas Chemicals, for example. These materials have an index of refraction n in excess of 1.7 in the visible range.

Figure 11:
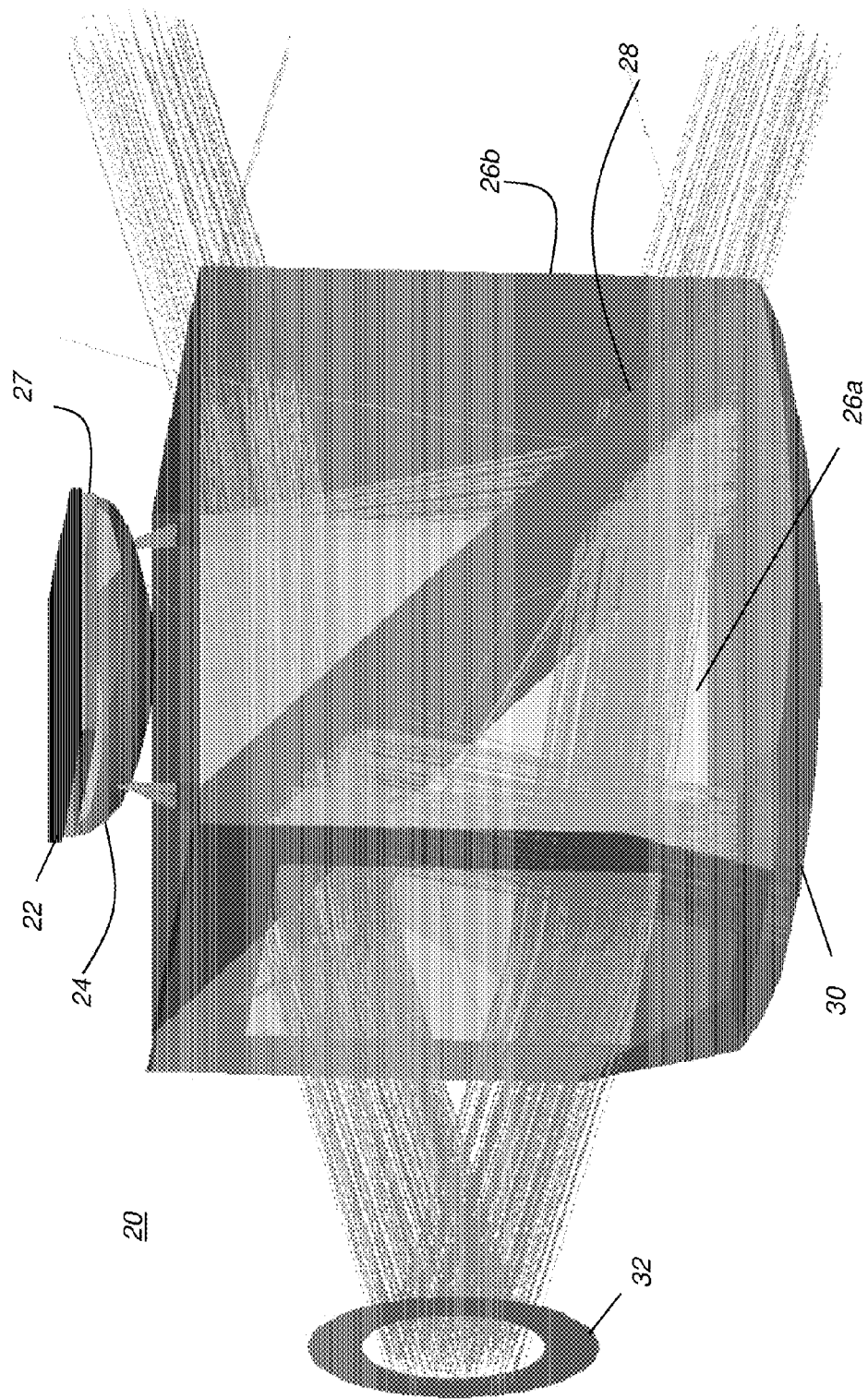
FIG. 11 is a perspective view showing light paths within the display module.

As was shown earlier in FIG. 5, prism 26 is typically formed as a composite prism, from at least two prism segments 26a and 26b, with beam splitter 28 formed at their interface surface. In addition, as shown in FIG. 5 a smaller prism segment 48 is added in one embodiment. As the light ray paths of FIG. 5 indicate, the use of prism segment 48 helps to enlarge the field of view to prevent loss of some of the see-through scene content, which would otherwise be subject to some amount of vignetting. The embodiment of FIG. 11 shows an arrangement of prism 26 with prism segment 48 removed.

Use of Catadioptric Mirror 30

The reflector element of display module 20, denoted mirror 30 in the present application, is a Mangin-type catadioptric mirror in one embodiment. Minor 30 is a positive-power, second-surface minor, a composite reflective structure that provides a minor surface coated onto a transparent substrate, here, coated onto a plano-convex lens. Mirror 30 provides a curved reflector element in the path of the imaged light through prism 26. Minor 30 is disposed so that it is adjacent to prism 26. With this arrangement, the catadioptric minor presents two surfaces to incident light, a refractive and a reflective surface. The reflective surface of this catadioptric structure can be spherical. However, with a spherical mirror, the image of device 22 would have significant distortion. Embodiments of the present invention use an aspheric surface for mirror 30, so that distortion is reduced typically from about 8% to less than 2%.

Catadioptric minor 30 is preferably cemented to the surface of prism 26, optically coupled to the prism in order to reduce the number of coated surfaces and unwanted reflections. In one embodiment, the catadioptric mirror is made of a different glass with different dispersion as compared with the prism glass or plastic. This allows for control of prism-induced lateral color.

It is also possible to ease the optical requirements somewhat for lateral color and distortion correction by providing electronic correction for these aberrations. Electronic correction of this type, using techniques well known to those skilled in the image processing arts, manipulates the data provided to emissive display 22 in order to compensate for these errors. Typically, however, the use of electronic correction results in loss of usable pixels and increases the cost of the system electronics. Electronic correction is also difficult to provide in real-time viewing applications. When electronic correction is used for lateral color and distortion compensation, the prism and the catadioptric mirror can be formed from the same glass or other substrate and minor 30 can have a spherical surface.

Figure 12:
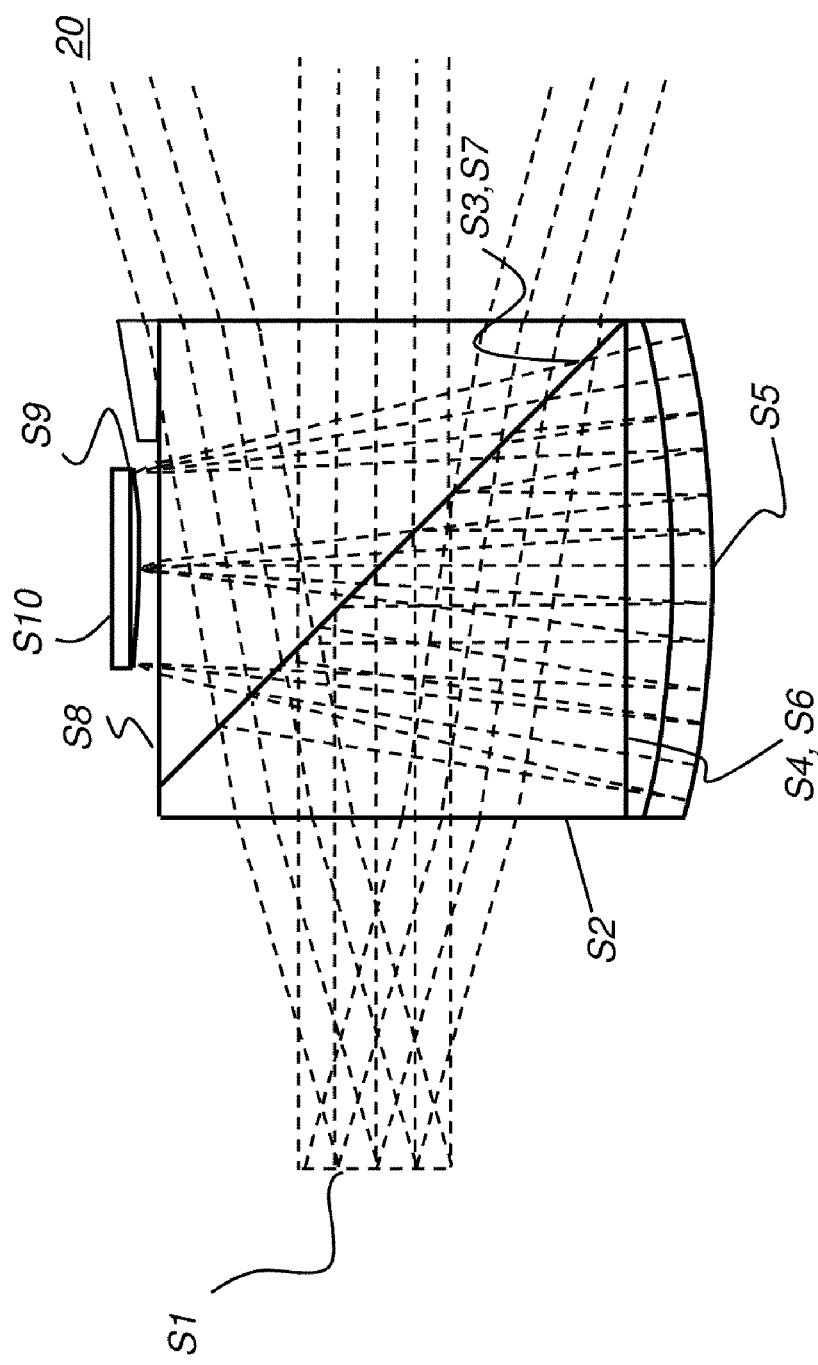
FIG. 12 is a side view showing surface designations for the display module.

FIG. 12 is a side view showing surface designations S1-S10 for the display module. Table 1 shows design details for display module 20 according to one embodiment.

TABLE 1

Design Details for Display Module Imaging Path

| Surf # | Surface | Surface Type | Radius | Thickness | Glass |
|---|---|---|---|---|---|
|  | Object | STANDARD | Infinity |  |  |
| S1 | entrance pupil | STANDARD | Infinity | 23 |  |
| S2 | eye side prism surface | STANDARD | Infinity | 16.25 | S-LAM66 |
| S3 | splitter | STANDARD | Infinity | −16.25 | MIRROR |
| S4 | catad. plano surface | STANDARD | Infinity | −4.7169 | S-FSL5 |
| S5 | mirror | EVENASPH | 70.09912 | 4.7169 | MIRROR |
| S6 | catad. plano surface | STANDARD | Infinity | 16.25 | S-LAM66 |
| S7 | splitter | STANDARD | Infinity | 14.25 | S-LAM66 |
| S8 | prism OLED side surface | STANDARD | Infinity | 1.25 |  |
| S9 | field lens | STANDARD | 19.0971 | 3.69058 | S-LAH66 |
| S10 | immersed Image | STANDARD | Infinity | 19.7406 |  |

Figure 13:
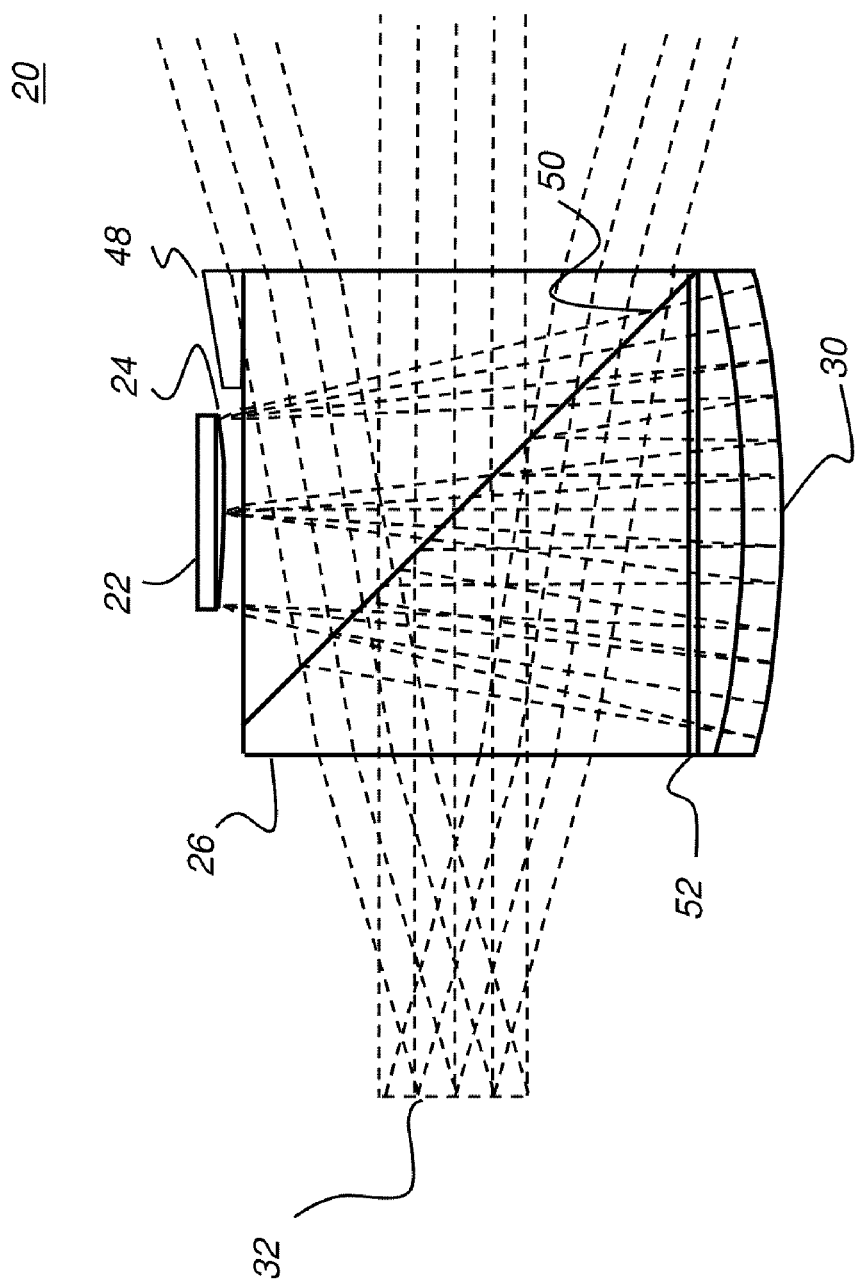
FIG. 13 is a side view showing an alternate embodiment with a polarization beam splitter and analyzer.

Use of Polarization Beam Splitter

Where polarized light is used, a polarization beam splitter can be used in place of beam splitter 28 and an accompanying analyzer can be added. The side view of FIG. 13 shows an embodiment with a polarization beam splitter 50 and a quarter wave plate 52.

The use of a polarization beam splitter can have advantages for increasing the efficiency of display module 20. With a non-polarization beam splitter, half the light is lost with each transit through beam splitter 28, so that only about 25% of the emitted light is available for providing the electronic image. Using polarized light enables a substantial increase in light output, at the cost of some added components and complexity. In an embodiment in which display 22 emits polarized light, substantially all of the light can be directed through display module 20.

Embodiments of the present invention provide improved performance over earlier HMD devices, with see-through operation over a field of view (FOV) at nearly 50 degrees. Using a 1280×1024 pixel OLED display, angular resolution to 1 min. can be obtained. The entrance pupil is 10 mm or larger and eye relief of 23 mm is provided. Distortion is reduced, with not more than about 15% distortion along edges of the field. The device is lightweight and low cost and allows compact packaging.

Figure 14A:
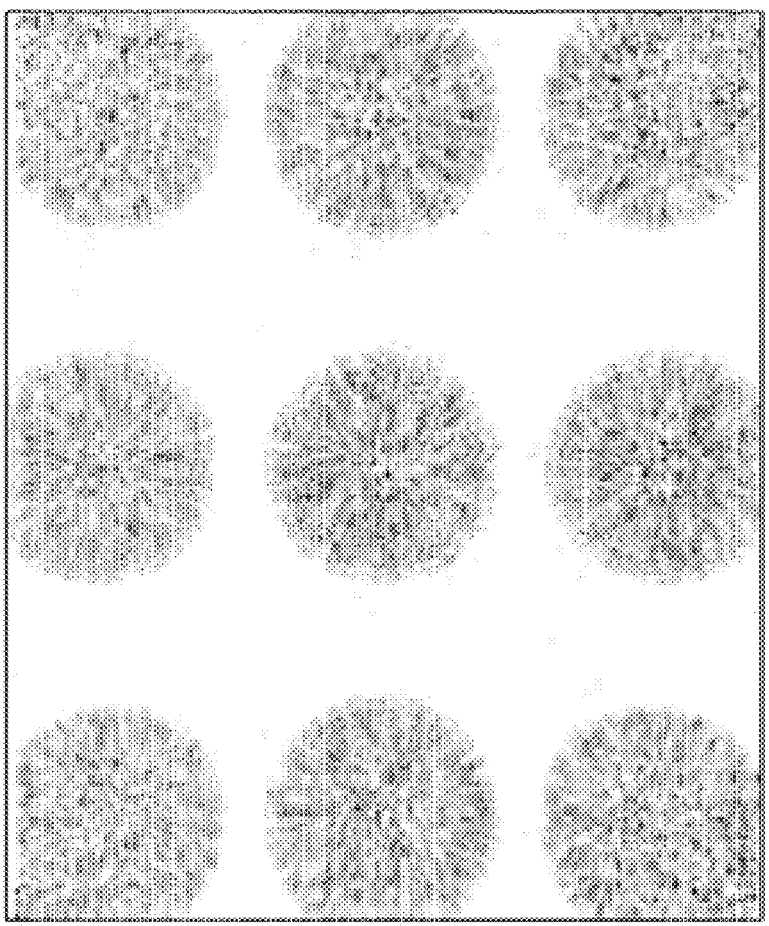
FIG. 14A is a plan view showing vignetting of the electronic image.
Figure 14B:
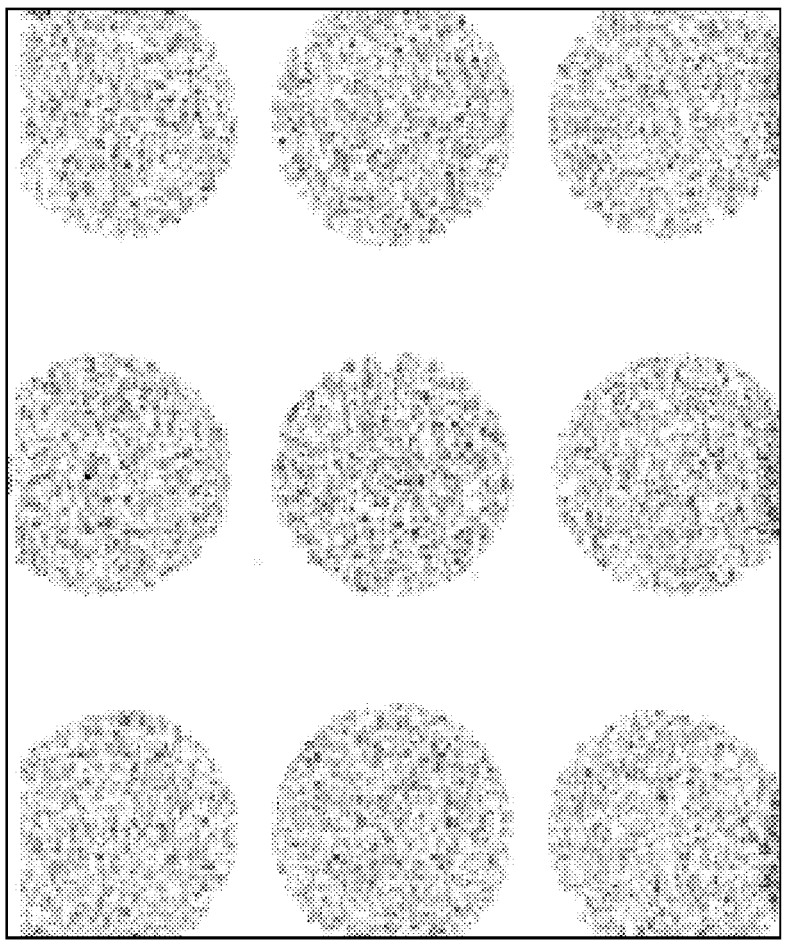
FIG. 14B is a plan view showing vignetting of the see-through scene image.

Even with some amount of shaping of prism 26 to suit the facial anatomy of the viewer, vignetting can be kept to low levels. FIG. 14A shows vignetting for pupils over the field for the electronic display image from display 22. This vignetting is measured at catadioptric mirror 30. FIG. 14B shows vignetting for pupils over the field for the see-through scene that appears to the viewer at eye box 32 when looking through prism 26.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while an emissive display device such as an OLED device allows the most compact packaging configuration, a transmissive spatial light modulator such as a liquid crystal display (LCD) with an accompanying light source could alternately be used as display 22 in embodiments described herein.

PARTS LIST

| | |
|---|---|
| 10. | Head-mounted optical apparatus |
| 12. | Support |
| 20, 20L, 20R. | Display module |
| 22. | Emissive display |
| 25. | Fiber lens |
| 26. | Prism |
| 26a, 26b. | Prism segment |
| 24. | Field lens |
| 27. | Cover glass |
| 28. | Beam splitter |
| 29. | Fiber face plate |
| 30. | Mirror |
| 32. | Eye box |
| 34. | Fiber face plate |
| 40. | OLED device |
| 42. | Circuit board |
| 44. | Encapsulation material |
| 46. | Cover fiber plate |
| 48. | Prism segment |
| 50. | Polarization beam splitter |
| 52. | Quarter wave plate |
| CP. | Center of curvature |
| F, F'. | Focal Points |
| f. | Effective focal length |
| L1. | Lens |
| O. | Source object |
| $P_E$. | Entrance pupil |
| S1-S10. | Surface |

The invention claimed is:

1. A see-through head-mounted optical apparatus for a viewer comprising at least one display module, each display module comprising:
    a display that is energizable to form an image;
    a positive field lens optically coupled to the surface of the display and disposed to direct imaged light from the display toward a first surface of a prism; and
    a curved reflector element in the path of the imaged light through the prism and disposed adjacent to a second surface of the prism, opposite the first surface, the curved reflector element comprising a refractive surface and a curved reflective surface that is disposed to collimate imaged light received from the display and direct the collimated imaged light toward a beam splitter that is disposed within the prism and that is at an oblique angle to the collimated reflected light;
wherein the beam splitter redirects the incident collimated reflected light through the prism to form an entrance pupil for the viewer.

2. The head-mounted optical apparatus of claim 1 wherein the display is an organic light emitting diode.

3. The head-mounted optical apparatus of claim 1 wherein the display comprises a liquid crystal device.

4. The head-mounted optical apparatus of claim 1 comprising two display modules, one for each of the left and right eyes of the viewer.

5. The head-mounted optical apparatus of claim 1 wherein the curved reflective surface is substantially concentric to the center of the entrance pupil.

6. The head-mounted optical apparatus of claim 1 wherein the field lens is a fiber lens.

7. The head-mounted optical apparatus of claim 1 wherein the curved reflective surface is aspheric.

8. The head-mounted optical apparatus of claim 1 wherein the beam splitter is a polarization beam splitter.

9. The head-mounted optical apparatus of claim 1 wherein the display comprises a fiber optic faceplate.

10. The head-mounted optical apparatus of claim 1 wherein the prism is a composite prism that is formed by cementing together a first prism segment, a second prism segment, and a third prism segment, wherein the third prism segment is cemented against the first surface of the prism.

11. The head-mounted optical apparatus of claim 1 wherein the prism is formed from a high-index plastic.

12. The head-mounted optical apparatus of claim 1 wherein a plano surface of the curved reflector element is in optical contact with the second surface of the prism.

13. A see-through head-mounted optical apparatus for a viewer comprising a left-eye display module and a right-eye display module, each display module comprising:
    an emissive display that is energizable to form an image;
    a positive field lens that comprises optical fibers and is optically coupled to the surface of the display and is disposed to direct imaged light from the display toward a first surface of a prism;
    a curved reflector element in the path of the imaged light through the prism and disposed adjacent to a second surface of the prism, opposite the first surface, the curved reflector element comprising a refractive surface that is optically coupled to the second surface of the prism and a curved aspheric reflective surface that is disposed to collimate imaged light received from the display and direct the collimated imaged light toward a beam splitter that is disposed within the prism and that is at an oblique angle to the collimated reflected light;
wherein the beam splitter redirects the incident collimated reflected light through the prism to form an entrance pupil for the viewer.

14. The head-mounted optical apparatus of claim 13 wherein the beam splitter is a polarization beam splitter.

15. The head-mounted optical apparatus of claim 13 wherein the prism is a composite prism that is formed by cementing together a first prism segment, a second prism segment, and a third prism segment, wherein the third prism segment is cemented against the first surface of the prism.

16. The head-mounted optical apparatus of claim 13 wherein the prism is formed from a high-index plastic.

17. A method for providing a see-through head-mounted display, the method comprising:
    energizing a display to form an image;
    directing imaged light from the display toward a first surface of a prism through a positive field lens that is optically coupled to the surface of the display;
    collimating the imaged light at a curved reflective surface that is disposed adjacent to a second surface of the prism, opposite the first surface, and directing the collimated imaged light toward a beam splitter that is disposed within the prism and that is at an oblique angle to the collimated reflected light; and
    forming an entrance pupil with the collimated reflected light for a viewer.

18. The method of claim 17 wherein energizing the display comprises energizing an organic light-emitting diode device.

19. The method of claim 17 wherein the prism is formed from a high-index plastic.

* * * * *